July 7, 1931. A. G. REDMOND 1,812,983
CONSTANT COMPRESSION DEVICE FOR INTERNAL COMBUSTION ENGINES
Original Filed Oct. 1, 1921  3 Sheets-Sheet 1
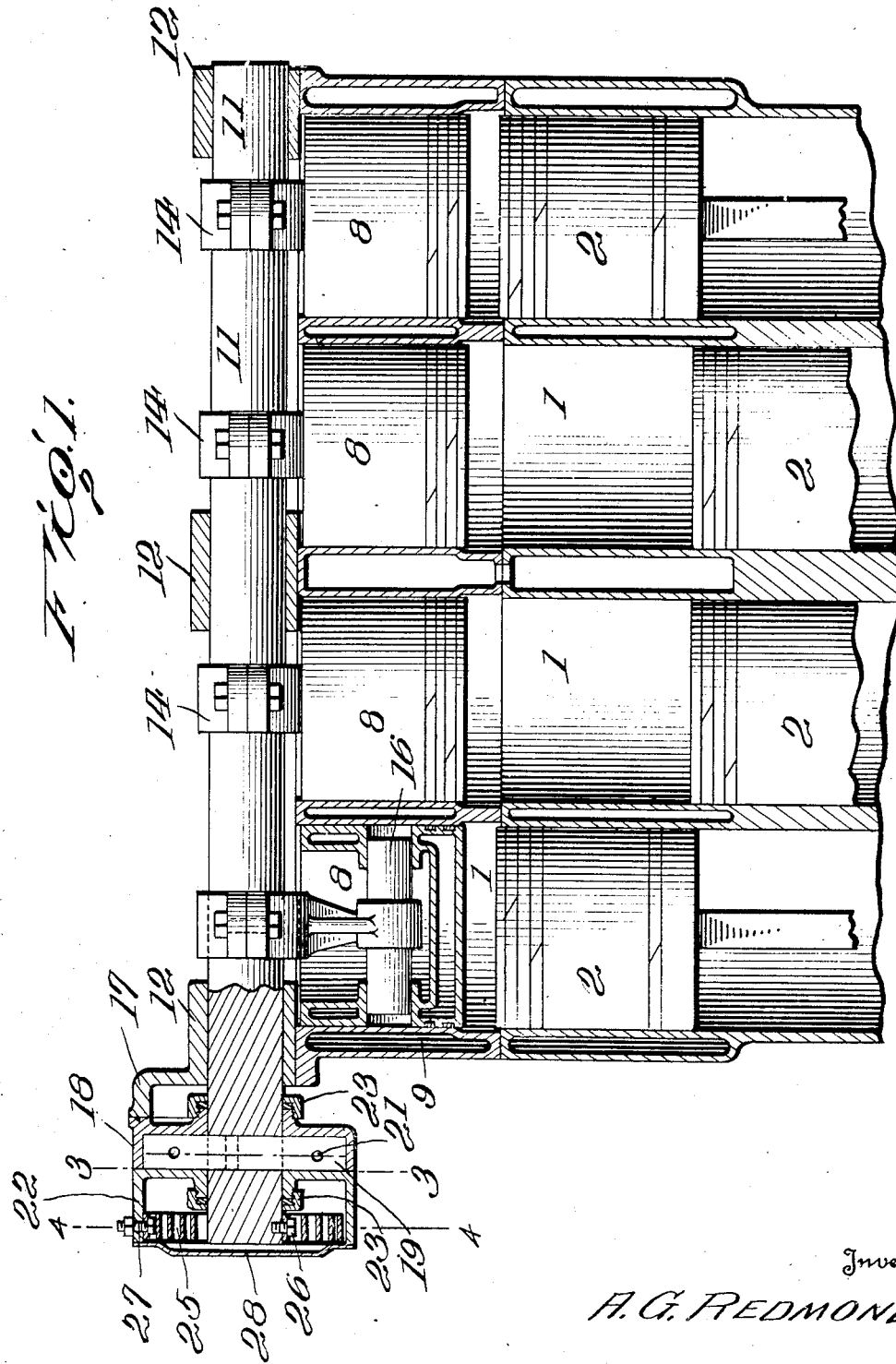
Inventor
A. G. REDMOND
By
Attorney

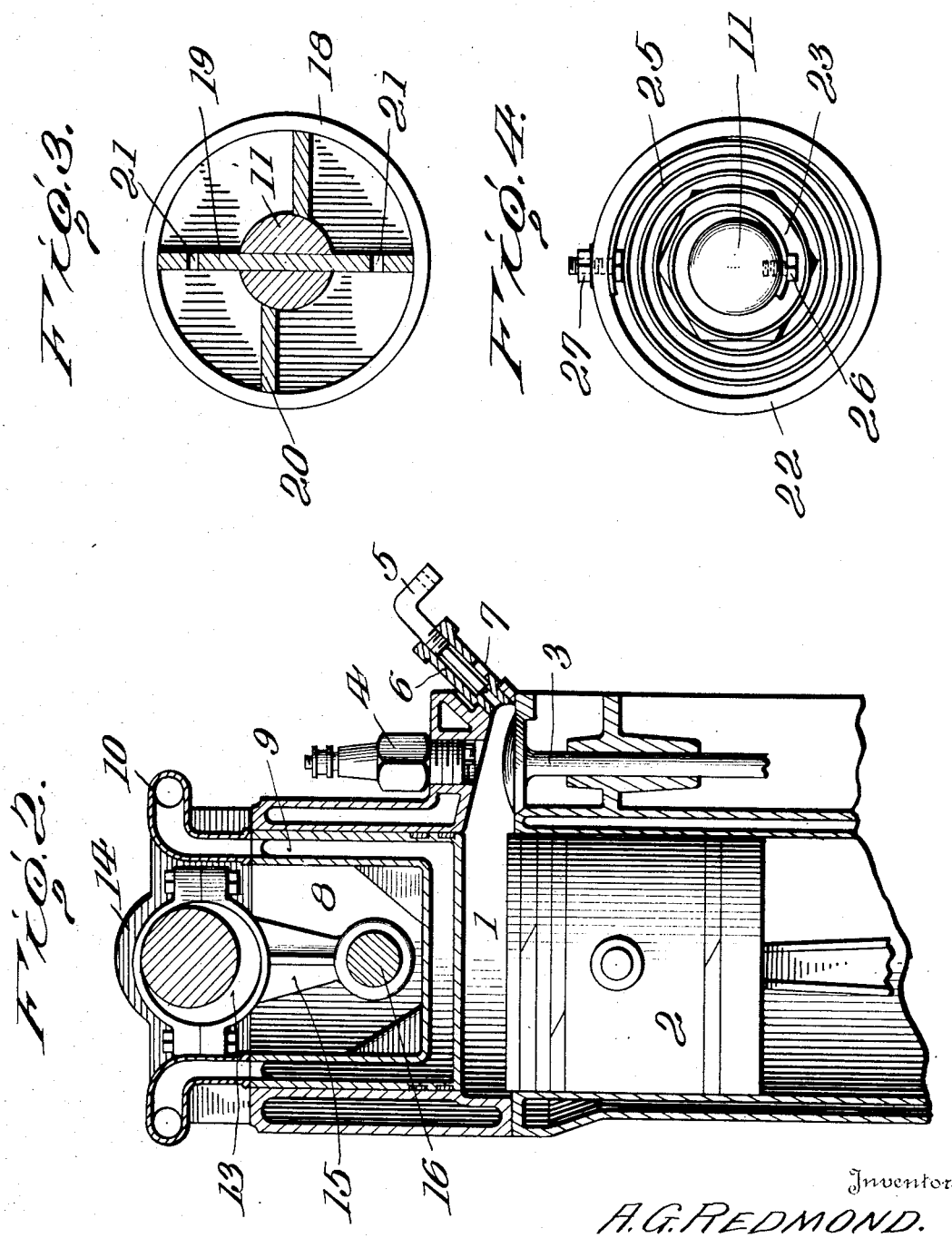

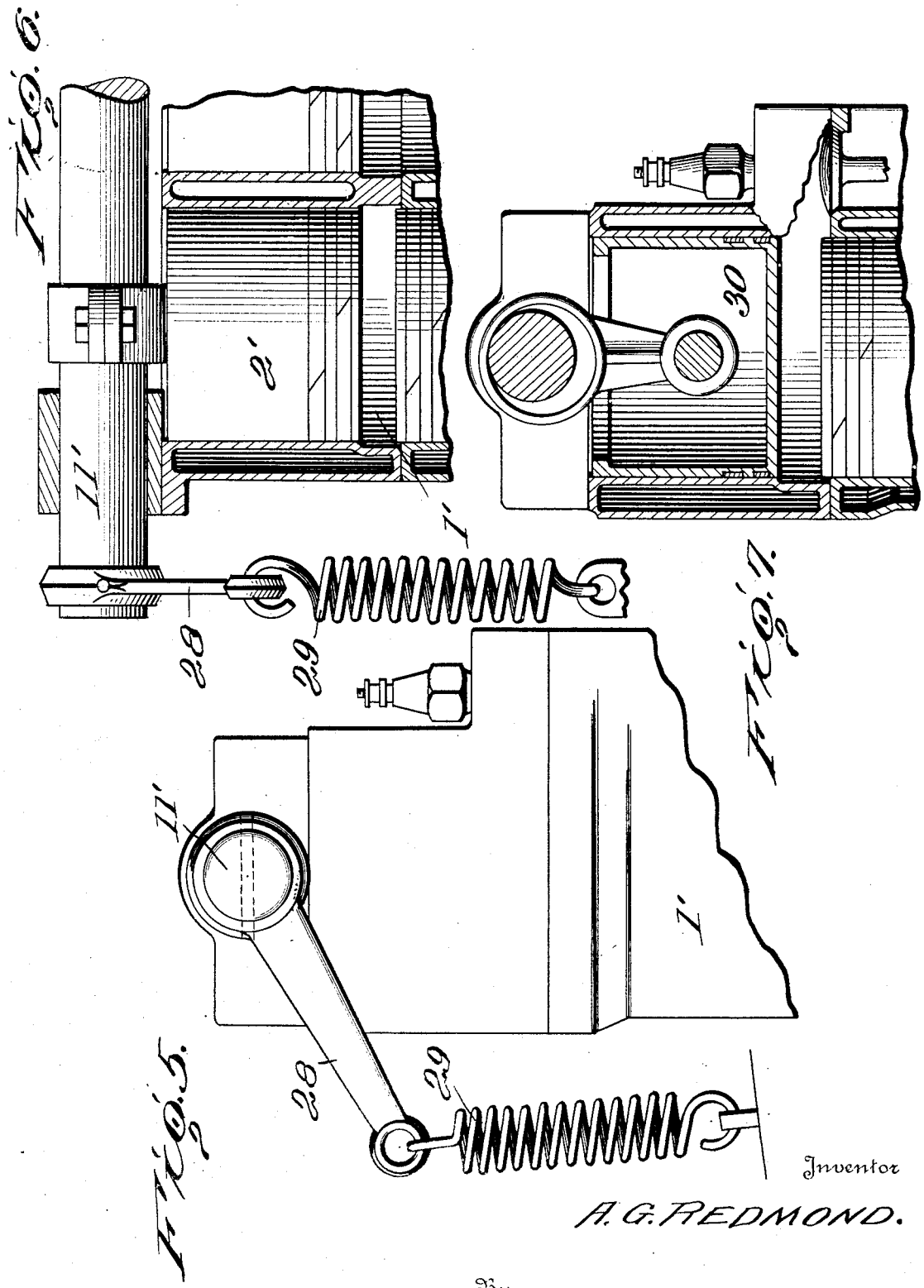

Patented July 7, 1931

1,812,983

UNITED STATES PATENT OFFICE

ALBERT G. REDMOND, OF INDIANAPOLIS, INDIANA, ASSIGNOR TO JACOB RICHARD FRANCIS, OF FLINT, MICHIGAN

CONSTANT COMPRESSION DEVICE FOR INTERNAL COMBUSTION ENGINES

Application filed October 1, 1921, Serial No. 504,615. Renewed April 19, 1928.

This invention relates to certain new and useful improvements in internal combustion engines, the object being to provide an internal combustion engine with adjustable combustion chambers whereby the cubic contents of the combustion chambers will be automatically controlled by the volume of explosive charge delivered thereto so that a constant compression may be maintained within the combustion chambers automatically by the position of the throttle valve in order to increase the efficiency of the engine and the miles per gallon of fuel.

Another object of my invention is to provide combustion chambers with movable auxiliary pistons, the position of which are controlled by the position of the throttle whereby the engine will run under substantially constant compression under varying loads so that when the throttle is partly open, the compression within the combustion chambers will be substantially the same as when the throttle is in full open position.

Another and further object of the invention is to provide novel means for controlling the position of the auxiliary pistons employed for changing the size of the combustion chambers whereby the piston will be moved automatically so as to change the cubic contents of the combustion chambers in accordance with the position of the throttle valve.

Another and further object of the invention is to provide a novel means for retarding the movement of the auxiliary pistons in their movements within the combustion chambers so as to prevent violent action one way or another.

Another and further object of the invention is to provide novel means for connecting the auxiliary pistons to a cam shaft, the movement of which is retarded by means controlled by the position of the throttle.

Other and further objects and advantages of the invention will be hereinafter set forth and the novel features thereof defined by the appended claims.

In the drawings,

Figure 1 is a longitudinal section through the upper portion of an internal combustion engine constructed in accordance with my invention;

Figure 2 is a vertical section taken at right angles to that of Figure 1;

Figure 3 is a section taken on line 3—3 of Figure 1;

Figure 4 is a section taken on line 4—4 of Figure 1;

Figure 5 is a detailed elevation of the upper portion of an internal combustion engine showing a modified form;

Figure 6 is a vertical section through the same;

Figure 7 is a detailed vertical section through another modified form.

In the embodiment of my invention as shown in Figures 1, 2, 3 and 4 I have shown a four-cylinder internal combustion engine provided with combustion chambers 1 in which are mounted the usual pistons 2. The combustion chamber is provided with the usual valves 3 and spark plugs 4 for igniting the explosive charge.

In order to relieve the compression when starting an internal combustion engine constructed in accordance with my invention when the engine is cold, I provide a manually operated valve 5 working in a plug 6 screwed into an opening formed in the combustion chamber as clearly shown in Figure 2, said plug having an opening 7 to the atmosphere so that when the valve is turned, the compression within the combustion chamber can be relieved. This valve is preferably operated from the dash and while I have shown certain details of construction in forming this valve, I do not wish to limit myself to these details as I am aware that various forms of valves and operating means can be used for relieving the pressure within the combustion chamber without departing from the spirit of my invention.

Slidably mounted within the upper end of each of the combustion chambers is an auxiliary piston 8 herein shown provided with a water jacket 9 connected to flexible pipes 10 extending from the cooling system of the internal combustion engine.

Extending longitudinally over the series of cylinders in the internal combustion engine is a shaft 11 mounted in suitable bearings 12, said shaft being provided with an excentric 13 over each cylinder over which is arranged an excentric strap 14 having a connecting rod 15 extending to wrist pin 16 so that when the shaft is oscillated, the auxiliary pistons will be moved in the cylinders so as to adjust the cubic contents of the combustion chamber.

One of the bearings 12 is extended as shown at 17 and connected to this extension is a cylindrical paddle case 18 in which works a paddle blade 19 extending transversely through the shaft 11. The paddle case is provided with stationary vanes 20 between which the paddles 19 are adapted to move and paddles 19 are provided with openings 21 forming ports through which the fluid within the paddle case is adapted to pass, so as to allow the shaft to oscillate slowly.

The paddle case is preferably filled with oil, the outer end of which is closed by spring cage 22 and the shaft is surrounded by stuffing boxes 23 and 24 for preventing the escape of oil from the paddle case. This provides means for preventing the violent action one way or another of the auxiliary pistons and while I have shown certain details of construction for accomplishing this result I do not wish to limit myself to these details of construction as I am aware that dash pot arrangements of other constructions can be used for retarding the oscillation of the shaft without departing from the spirit of my invention.

Mounted within the spring cage 22 is a spiral spring 25, one end of which is fastened to the shaft 11 by a screw 26 and the other end to the spring cage 22 by bolt 27. As the auxiliary pistons move upward within the combustion chamber, the spring is wound up and the compression required to overcome the spring is predeterminedly fixed so that the cubic contents of the combustion chamber will be automatically controlled. The spring cage is enclosed by a cover 28 as clearly shown in Figure 1.

When the throttle is opened wide, the compression in the combustion chamber forces the auxiliary piston upwardly and in moving upwardly the piston overcomes the resistance offered by the spring end and when the throttle is partly closed, the auxiliarly piston is moved downwardly by the spring so as to decrease the cubic contents of the combustion chamber and it will be seen that by this construction that a constant compression is maintained in the cylinder when under bearing load so as to increase the efficiency of the engine. While in the drawings I have shown certain details of construction for automatically moving the auxiliary pistons in and out of the combustion chambers by the volume of explosive charge emitted through the position of the throttle, I do not wish to limit myself to these details as I am aware that changes may be made without departing from the spirit of my invention.

In the embodiment of my invention as shown in Figures 5 and 6, the shaft 11' is constructed substantially the same as shown in the preferred form of the invention and is provided with an excentric having connecting rods connecting the same to pistons 2' mounted in the combustion chamber 1'. Secured to one end of the shaft 11' is a crank arm 28 which is connected to a coil spring 29 which is adapted to be placed under tension when the throttle is in full open position by the upward movement of the auxiliary piston so that when the position of the throttle is changed, the auxiliary piston will be forced down into the combustion chamber so as to reduce the cubic contents thereof.

In Figure 7 I shows a construction identical with that shown in Figures 1 to 4 with the exception that the water jacket surrounding the auxiliary piston is eliminated and in this construction the piston 30 is mounted in the upper end of the combustion chamber and connected to the excentric shaft so as to move up and down therein in order to adjust the cubic contents of the combustion chamber.

From the foregoing description it will be seen that I have provided an internal combustion engine with adjustable combustion chambers, the cubic contents of which are automatically changed by the position of the throttle valve through the medium of auxiliary pistons mounted within the combustion chambers which are placed under tension by the compressions and explosions within the combustion chambers so that when the auxiliary pistons have been forced into such a position so that the full cubic contents of the combustion chambers are utilized, they will be held under pressure in order to enable the pistons to move in the combustion chambers when the throttle is partly closed, whereby a constant compression within the combustion chambers is maintained at all times.

By providing means for relieving the pressure in the combustion chambers, in starting an internal combustion engine constructed in accordance with my invention, I am able to start the engine when cold.

It will be observed from Fig. 1 that all of the auxiliary pistons 8 are connected to the auxiliary shaft 11 in such a manner that the pistons will move in unison. Consequently when the piston in the first cylinder moves upwardly, the pistons in the remaining cylinders will also move up to the same degree. However, it will be appreciated that as various pressures exist in the different cylinders on the compression stroke of each piston, that the movement of the auxiliary pistons will be modified or controlled to some extent by the pressures existing in the various cylinders of the engine. For example, all those cylinders in which there is a positive or plus pressure will each add its quota to the sum of pressures tending to move the auxiliary pistons against the spring pressure, and those cylinders, such for example as the cylinder on the intake stroke, which have a minus pressure, will tend to oppose the movement.

It will thus be seen that I have joined the movable cylinder heads or auxiliary pistons 8 into an inflexible association by way of the common shaft 11 which is connected to the resilient element or spring 25. Due to this construction the resilient element 25 is impressed by composite force resulting from a minus pressure in one cylinder on the intake stroke, a plus pressure in another cylinder on the compression stroke, a higher plus pressure in a third cylinder on the firing stroke, and a complex pressure, sometimes minus, on the exhaust stroke; with more variable components when more than four cylinders are used.

The operation of the internal combustion engine will be clearly understood from the foregoing description and while I have shown certain details of construction in accomplishing the desired result, I am aware that various changes can be made without departing from the spirit of my invention.

What I claim is:—

1. An internal combustion engine having a plurality of combustion chambers provided with auxiliary pistons slidably mounted therein, a shaft having a connection with each of said pistons for moving said auxiliary piston within said combustion chamber for adjusting the cubic contents thereof, means for retarding the oscillation of said shaft and yieldable means connected to said shaft for moving said pistons to adjust the cubic contents of said combustion chamber according to the position of the throttle.

2. An internal combustion engine having a combustion chamber provided with a working piston and an auxiliary piston, a shaft having a connection with said auxiliary piston for moving said piston within said combustion chamber for adjusting the cubic contents thereof, means for retarding the oscillation of said shaft and a spring having a connection with said shaft for oscillating said shaft and moving said piston for changing the cubic contents of said combustion chamber in accordance with the position of the throttle.

3. The combination with an internal combustion engine having a cylinder provided with a main piston and an auxiliary piston, of a shaft provided with an excentric mounted above said cylinder and an excentric sleeve mounted upon said excentric, a connecting rod carried by said excentric sleeve, a wrist pin carried by the auxiliary piston having a connection with said connecting rod, means for retarding the oscillation of said shaft in either direction and a spring for oscillating said shaft.

4. An internal combustion engine having a plurality of combustion chambers provided with auxiliary pistons slidably mounted therein, an excentric shaft having a connection with each of said pistons for moving said auxiliary piston within said combustion chamber for adjusting the cubic contents thereof, a paddle casing surrounding said shaft, a paddle carried by said shaft working in said casing, a spring cage and a spiral spring surrounding said shaft having a connection with said shaft in said cage.

5. The combination with an internal combustion engine having a plurality of cylinders provided with main and auxiliary pistons, of an excentric shaft for adjusting the position of said auxiliary pistons, a dash pot for retarding the oscillation of said shaft in either direction and a spring having a connection with said shaft adapted to be placed under tension under open throttle to change the cubic contents of said cylinder according to the position of the throttle.

6. An internal combustion engine having a plurality of cylinders each provided with a working piston and an auxiliary piston, a shaft provided with a plurality of excentrics, excentric sleeves surrounding said excentrics having connections with said auxiliary pistons, a paddle casing having stationary vanes surrounding said shaft, paddles provided with openings carried by said shaft working in said casing, a spring cage surrounding said shaft and a spiral spring arranged within said cage having one of its ends connected to said cage and the other to said shaft for operating said shaft to change the cubic contents of said cylinders.

7. The combination with an internal combustion engine having a plurality of pistons each provided with a working and an auxiliary piston, a shaft having a connection with each of said auxiliary pistons, means for retarding the oscillation of said shaft and yieldable means connected to said shaft adapted to be placed under tension by the explosion of the charge within said combustion chamber for automatically maintaining constant compression.

8. An internal combustion engine including a plurality of cylinders, each cylinder having a compression chamber and means to conduct an explosive charge into the same, a main piston in each cylinder for compressing the charge, and means responsive to changes in the pressures developed in the said compression chambers by the operator of said engine to produce isochronic and isometric changes in the volumetric capacities of said compression chambers to thereby approximate unifrom compression of the charge regardless of its quantity.

9. In an internal combustion engine, a plurality of cylinders, each cylinder having a compression chamber and means to conduct an explosive charge to the same, a main piston in each cylinder by a movement of which said charge may be compressed, and means including auxiliary pistons arranged in the cylinders to respond to changes in the pressures developed in the said compression chambers during the operation of the engine to produce isochronic and isometric changes in the volumetric capacities of said compression chambers to thereby approximate a uniform compression of the charge regardless of its quantity.

10. In an internal combustion engine, a plurality of cylinders, main pistons for the cylinders, an auxiliary piston arranged in each cylinder, means joining said auxiliary pistons for causing the same to move in unison under pressures developed in the cylinders, and resilient means associated with the last mentioned means for resisting movement of the auxiliary pistons in one direction.

11. In an internal combustion engine, a plurality of cylinders, main pistons in the cylinders, an auxiliary piston arranged in each cylinder, means including a rigid shaft joining the auxiliary pistons for causing the latter to move in unison under pressure developed in the cylinders, and resilient means associated with the shaft for resisting the movement of the auxiliary pistons in one direction.

12. In an internal combustion engine, a plurality of cylinders, each cylinder having a compression chamber, means to admit an explosive charge to the compression chamber of each cylinder, main pistons in the cylinders for compressing the charges, and means responsive to changes in the pressures developed in the said compression chambers by the operation of the engine to produce isochronic and isometric changes in the volumetric capacities of said compression chambers to thereby approximate a uniform compression of the charge regardless of its quantity, said means including an auxiliary piston arranged in each cylinder, a crank shaft, means connecting the auxiliary pistons to the crank shaft for causing the auxiliary pistons to move in unison, and a resilient element associated with the crank shaft and yieldingly resisting the movement of the auxiliary pistons in one direction.

13. In an internal combustion engine a plurality of cylinders, each cylinder having a compression chamber, means to conduct an explosive charge to each cylinder, a piston in each cylinder by a movement of which said charge may be compressed, and mechanical means responsive to changes in the pressures developed in the said compression chambers by the operation of said engine to produce isochronic and isometric changes in the volumetric capacities of said compression chambers to thereby approximate a uniform compression of the charge regardless of its quantity.

14. In an internal combustion engine, a plurality of cylinders, each cylinder having a compression chamber, means to conduct an explosive charge to each cylinder, a piston in each cylinder by a movement of which said charge may be compressed, and reactive means responsive to changes in the pressures developed in the said compression chambers by the operation of said engine to produce isochronic and isometric changes in the volumetric capacities of said compression chambers to thereby approximate a uniform compression of the charge regardless of its quantity.

15. In an internal combustion engine, a plurality of cylinders, each cylinder having a compression chamber, means to conduct an explosive charge to each cylinder, a piston in each cylinder by a movement of which said charge may be compressed, and elastically restrained means responsive to changes in the pressures developed in the said compression chambers by the operation of said engine to produce isochronic and isometric changes in the volumetric capacities of said compression chambers to thereby approximate a uniform compression of the charge regardless of its quantity.

16. In an internal combustion engine, a plurality of cylinders, each cylinder having a variable compression chamber of minimum, intermediate and maximum capacity, means to conduct an explosive charge to each cylinder, a piston in each cylinder by a movement of which said charge may be compressed, and means responsive to changes in the pressures developed in the said compression chambers by the operation of said engine to produce isochronic and isometric changes in the volumetric capacities of said compression chambers to thereby approximate a uniform compression of the charge regardless of its quantity.

17. In an internal combustion engine, a plurality of cylinders, each cylinder having a variable compression chamber, means to conduct an explosive charge to each cylinder, a piston in each cylinder by a movement of which said charge may be compressed, means responsive to changes in the pressures developed in the said compression chambers by the operation of said engine to produce isochronic and isometric changes in the volumetric capacities of said compression chambers to thereby approximate a uniform compression of the charge regardless of its quantity, and means to automatically return said responsive means to normal position to produce compression chambers of minimum capacity, when the pressures in the chambers cease to exist.

18. In an internal combustion engine, a plurality of cylinders, each cylinder having a compression chamber, means to conduct an explosive charge to each cylinder, a piston in each cylinder by a movement of which said charge may be compressed, an auxiliary piston in each cylinder, and means mechanically uniting the auxiliary pistons in unchanging relationship to each other, whereby the auxiliary pistons are capable of moving as a unit to vary the volumetric capacity of said compression chambers.

In testimony whereof I hereunto affix my signature.

ALBERT G. REDMOND.